(12) United States Patent
Higashida

(10) Patent No.: US 7,026,976 B1
(45) Date of Patent: Apr. 11, 2006

(54) RADAR APPARATUS HAVING FUNCTION OF ESTIMATING TARGET'S WIDTH

(75) Inventor: Hirofumi Higashida, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 450 days.

(21) Appl. No.: 10/738,085

(22) Filed: Dec. 16, 2003

(30) Foreign Application Priority Data

Jan. 14, 2003 (JP) ............................. 2003-005898

(51) Int. Cl.
*G01S 13/93* (2006.01)
*G01S 13/42* (2006.01)
*G01S 13/88* (2006.01)

(52) U.S. Cl. .................... 342/70; 342/27; 342/118; 342/128; 342/133; 342/175; 342/195; 701/300; 701/301

(58) Field of Classification Search .................... 342/27, 342/28, 70–72, 118, 128, 129–133, 175, 192, 342/193–197, 147; 701/1, 36, 43, 46, 47, 701/70, 93, 96, 300, 301
See application file for complete search history.

(56) References Cited

FOREIGN PATENT DOCUMENTS

| JP | 7-225276 A | 8/1995 |
|---|---|---|
| JP | 11-45397 A | 2/1999 |
| JP | 11-183601 A | 7/1999 |
| JP | 2000-180540 A | 6/2000 |

*Primary Examiner*—Bernarr E. Gregory
(74) *Attorney, Agent, or Firm*—Christie, Parker & Hale, LLP

(57) ABSTRACT

In a radar apparatus, when the width of a target cannot be determined, the width is estimated in such a manner as not to erroneously identify the lane in which the target is traveling. Denoting the actual width of the target by D, the distance to the target by R, and the scanning step width of projection angle by A, the estimated value W for the width of the target is computed in accordance with the equation $W = D - 2R \tan A$.

7 Claims, 3 Drawing Sheets

RADAR APPARATUS HAVING FUNCTION OF ESTIMATING TARGET'S WIDTH

CROSS-REFERENCE TO RELATED APPLICATION

This application claims priority of Japanese Patent Application Number 2003-005898, filed on Jan. 14, 2003.

BACKGROUND OF THE INVENTION

1. Field of the Invention

The present invention relates to a radar apparatus having the function of estimating a target's width.

2. Description of the Related Art

An FM-CW radar equipped with a function to scan the radiowave projection direction mechanically or electronically, for example, can not only measure the distance and relative velocity of a target but also determine the bearing to the target (azimuth angle to the target). Further, as described, for example, in Japanese Unexamined Patent Publication No. H11-183601, the lateral position and width of the target can be determined by analyzing the distribution of reflections from the same target with respect to the projection angle. If the lateral position and width of the target can be determined, vehicle-to-vehicle distance control can be performed, for example, in such a manner that, when a vehicle traveling ahead moves into the same lane as the radar-equipped vehicle, the vehicle speed is reduced to maintain a prescribed vehicle-to-vehicle distance and, when the vehicle traveling ahead moves into another lane, the speed is increased up to the preset cruising speed.

The lateral position X and width W of a target obtained by analyzing the distribution of reflections from the same target with respect to the projection angle $\theta$ can be expresses as $$X \approx R \sin \theta m \quad (1)$$

$$W \approx R \tan \Delta\theta \quad (2)$$

where $\theta m$ is the angle corresponding to the center of the distribution, $\Delta\theta$ is the angle difference corresponding to the width of the distribution, and R is the distance to the target; here, it is understood that $\Delta\theta << 0$.

As can be seen from the equation (2), the angle difference $\Delta\theta$ decreases as the distance R to the target of width W increases. When $\Delta\theta$ decreases to a value almost equal to the scanning step width of the projection angle, only one or two reflections can be obtained from the same target, and as a result, the width W of the target cannot be determined. Therefore, in this case, an estimated value is used for the width W of the target. At this time, error (uncertainty) in the lateral position X increases, because the angle $\theta m$ corresponding to the lateral position of the target cannot be determined with finer resolution than the step width of the projection angle.

If, for example, a predetermined given value is used as an estimated value for W, and as the error in the lateral position X (azimuth angle $\theta m$) is large, there occurs a problem such that, when the vehicle traveling ahead is not actually in the same lane as the radar-equipped vehicle, control is performed for deceleration by erroneously determining that the vehicle ahead has moved into the same lane.

SUMMARY OF THE INVENTION

It is an object of the present invention to provide a radar apparatus having the function of estimating the width of a target without causing a problem such as described above when identifying the lane in which the target is traveling.

A radar apparatus according to the present invention comprises: part for determining the width of a target based on a plurality of reflections obtained from the same target when the projection direction of a beam is scanned; and part for estimating the width of the target based on an uncertainty in azimuth angle to the target and on the distance to the target when the width determining part is unable to determine the width.

Denoting a predetermined target width, for example, by D, the distance to the target by R, and the uncertainty in the azimuth angle by A, the width estimating part computes an estimated value W for the width of the target in accordance with the equation $W = D - 2R \tan A$.

DESCRIPTION OF THE PREFERRED EMBODIMENTS

Figure 1:
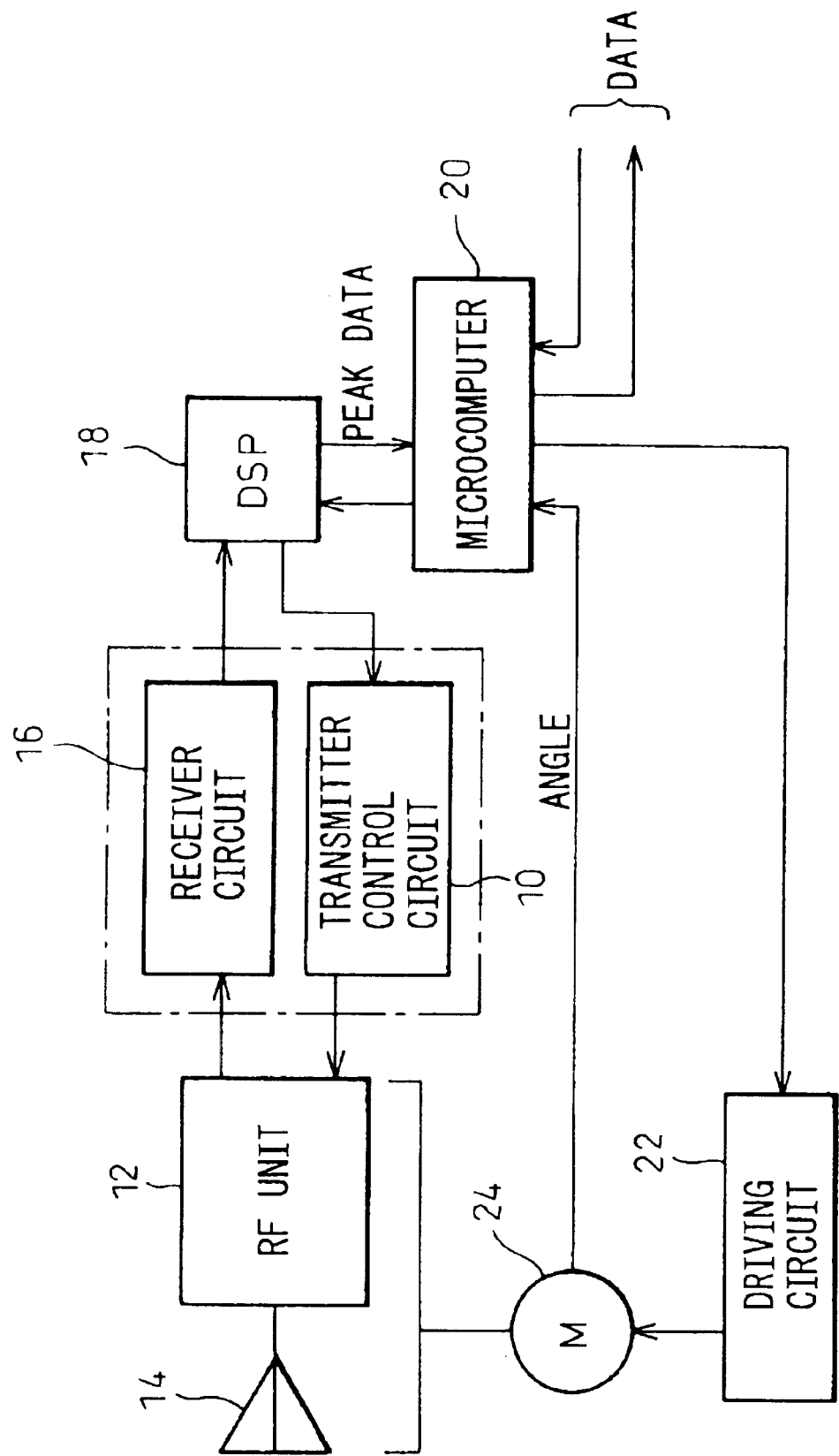
FIG. 1 is a block diagram of a millimeter-wave radar apparatus as one example of a radar apparatus to which the present invention is applied.

FIG. 1 shows the configuration of a millimeter-wave radar apparatus as one example of a radar apparatus to which the present invention is applied. In FIG. 1, a transmitter control circuit 10 outputs a triangular wave rising and falling alternately in cyclic fashion. An RF unit 12 generates a millimeter wave frequency-modulated by the triangular wave, and the frequency-modulated wave is radiated from an antenna 14. An echo signal from a target is received by the antenna 14, and the received echo signal is mixed in the RF unit 12 with a portion of the transmitted signal to produce a beat signal having a frequency equal to the difference between the transmitted signal and the echo signal. The beat signal thus produced is converted in a receiver circuit 16 to the baseband signal which is fed into a DSP 18. In the DSP 18, conversion from the time domain to the frequency domain is performed by applying FFT on each of the rising section (up beat) and falling section (down beat) of the triangular wave. Further, the DSP 18 extracts peaks (up peaks) appearing in the frequency spectrum of the rising section and peaks (down peaks) appearing in the frequency spectrum of the falling section, and supplies the extracted peaks to a microcomputer 20. On the other hand, a driving circuit 22 scans the projection direction of the antenna 14 by driving a motor 24, and angle data obtained at each instant in time is supplied to the microcomputer 20.

In the microcomputer 20, first, a plurality of peaks whose frequencies and angles are close to each other are grouped together as representing reflections from the same target. From the distribution, with respect to the angle, of the intensities of the plurality of peaks belonging to the same group, the center angle $\theta m$ and angle width $\Delta\theta a$ of the target are determined by using, for example, the technique described in paragraphs 0060 and 0061 in the earlier cited Japanese Unexamined Patent Publication No. H11-183601, and then, the lateral position and width of the target are determined by using the technique described in paragraphs 0077 and 0078.

If the width and, hence, the lateral position, of the target cannot be determined accurately because the number of peaks belonging to the same group is small, the width of the target is estimated in the following way according to the present invention.

Figure 2:
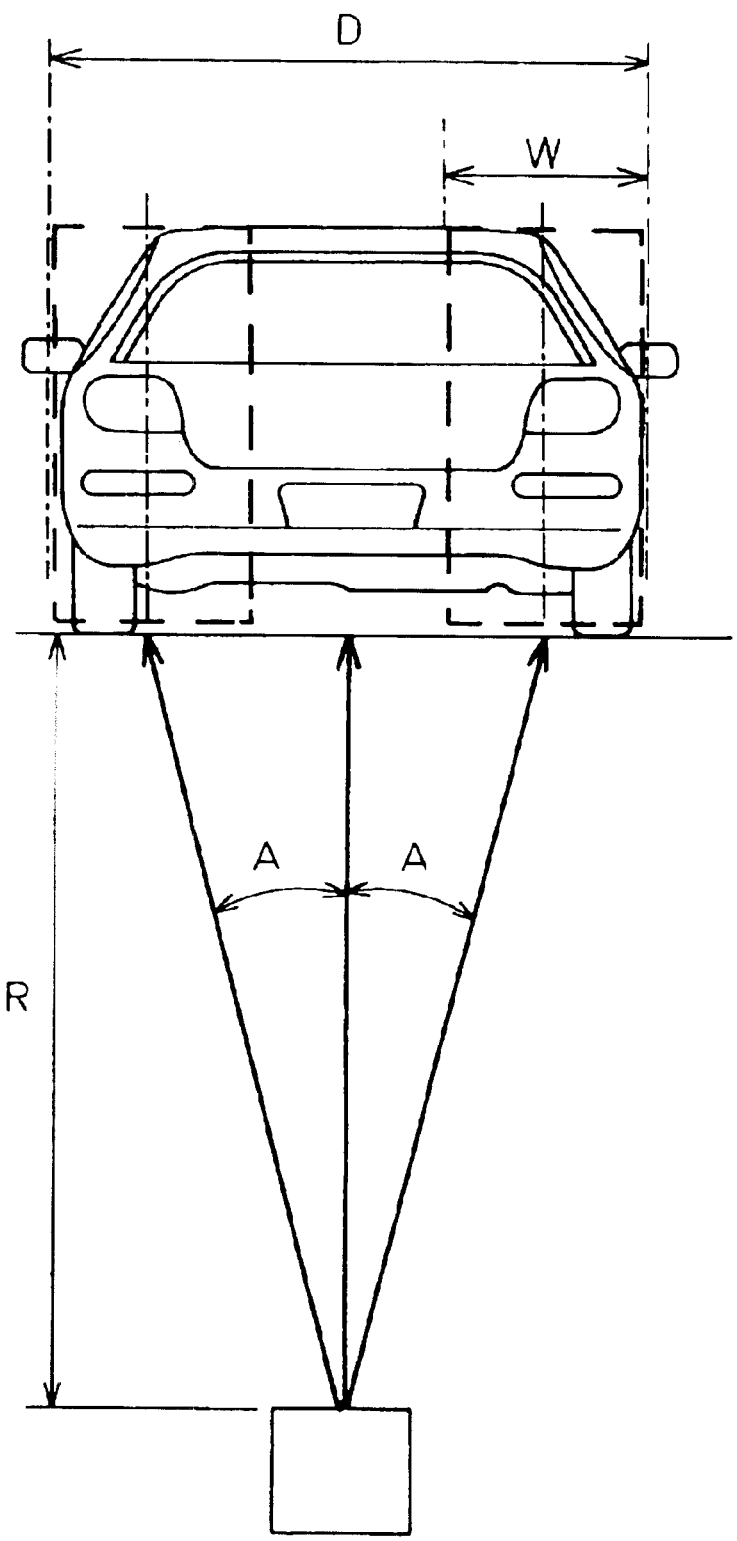
FIG. 2 is a diagram for explaining a method of estimating a width.

In the above case, when the angle step width is denoted by A, and the distance to the target by R, the lateral position of the target has an error (uncertainty) equal to R tan A. When the actual vehicle width is denoted by D, that is, the dimension from the center of the vehicle to one side thereof is denoted by D/2, then if an estimated value W/2 for the dimension from the center of the vehicle to one side thereof is calculated so that the equation $$W/2 + R \tan A = D/2 \qquad (3)$$

holds, there is no possibility of the estimated position of the one side of the vehicle going outside the actual position of the one side of the vehicle (see FIG. 2) even when there is a maximum error of R tan A in the lateral position of the target. This therefore can prevent a situation in which, when the vehicle traveling ahead is not actually in the same lane as the radar-equipped vehicle, control is performed for deceleration by erroneously determining that the vehicle ahead has moved into the same lane.

From the equation (3), the estimated value W for the target's width, according to the present invention, is calculated as $$W = D - 2R \tan A \qquad (4)$$

Figure 3:
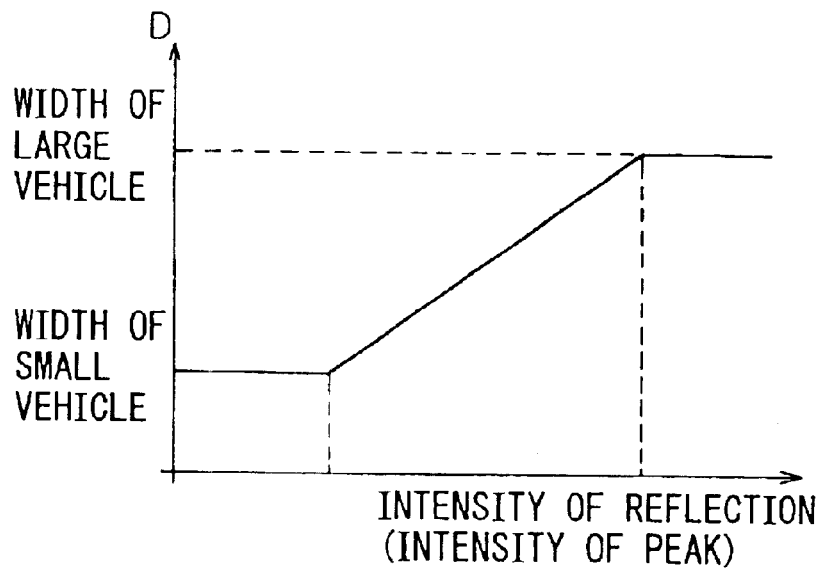
FIG. 3 is a graph showing one example of how a correction is made to the value of D based on the intensity of reflection.

The value of the vehicle width D is set, for example, equal to the smallest value of the widths of existing vehicles. Since the reflection level, that is, the peak intensity, is larger for larger-vehicles, the value of D may be varied according to the peak intensity, for example, as shown in FIG. 3. Further, the value of D may be varied according to the number of peaks belonging to the same group, instead of or in combination of the peak intensity.

Figure 4:
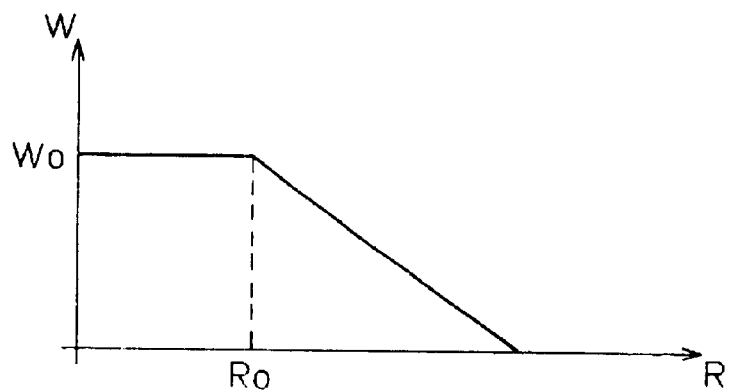
FIG. 4 is a graph showing a first example of how a correction is made to the estimated width W according to the distance R.
Figure 5:
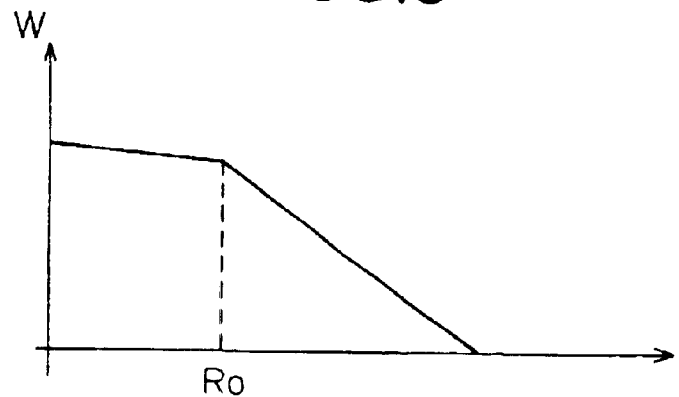
FIG. 5 is a graph showing a second example of how a correction is made to the estimated width W according to the distance R.

When the distance R is less than a given value R0, the reflection point may deviate from the center of the vehicle; accordingly, an upper limit value W0 may be imposed (as shown in FIG. 4) on the value of W to be determined in accordance with the equation (4) or with the equation (4) and the relationship of FIG. 3, or the change of rate of W may be reduced (as shown in FIG. 5).

When the number of peaks belonging to the same group increases, and the calculation of the vehicle width becomes possible, it is desirable to make the value of the vehicle width change smoothly by applying a filtering operation such as a moving average, rather than instantly switching from the estimated value of the vehicle width to the calculated value of the vehicle width. This also applies when switching from the calculated value to the estimated value.

As described above, according to the present invention, when the width of the target cannot be determined, the width can be estimated in such a manner as not to erroneously identify the lane in which the target is traveling.

What is claimed is:

1. A radar apparatus comprising:
   part for determining a width of a target based on a plurality of reflections obtained from the same target when a projection direction of a beam is scanned; and
   part for estimating the width of said target based on an uncertainty in azimuth angle to said target and on a distance to said target when said width determining part is unable to determine said width.

2. A radar apparatus according to claim 1, wherein
   said width estimating part computes an estimated value W for the width of said target in accordance with an equation $$W = D - 2R \tan A$$

where D is a predetermined target width, R is the distance to said target, and A is the uncertainty in said azimuth angle.

3. A radar apparatus according to claim 2, wherein said predetermined target width D is corrected in accordance with a magnitude of reflection from said target.

4. A radar apparatus according to claim 2, wherein said predetermined target width D is corrected in accordance with a number of reflections from the same target.

5. A radar apparatus according to claim 2, wherein when said distance R is less than a predetermined value, said width estimating part holds said estimated value W at a fixed value regardless of the value of the distance R.

6. A radar apparatus according to claim 2, wherein when said distance R is less than a predetermined value, said width estimating part reduces a rate of change of said estimated value W with respect to said distance R.

7. A radar apparatus according to claim 1, further comprising part for performing a filtering operation in order to smooth a transition from the target width determined by said width determining part to the target value estimated by said width estimating part and from the target width estimated by said width estimating part to the target value determined by said width determining part.

* * * * *